(12) United States Patent
Döpfner et al.

(10) Patent No.: US 6,379,594 B1
(45) Date of Patent: *Apr. 30, 2002

(54) PROCESS FOR PRODUCING WORKPIECES AND MOLDED PIECES OUT OF CELLULOSE AND/OR CELLULOSE-CONTAINING FIBER MATERIAL

(75) Inventors: Horst Döpfner, Taiskirchen; Martin Ernegg, Pram; Robert Bramsteidl, Agatha, all of (AT)

(73) Assignee: Zellform Gesellschaft m.B.H., Taiskirchen (AT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,011
(22) PCT Filed: Sep. 12, 1997
(86) PCT No.: PCT/AT97/00200
§ 371 Date: Jul. 22, 1998
§ 102(e) Date: Jul. 22, 1998
(87) PCT Pub. No.: WO98/11973
PCT Pub. Date: Mar. 26, 1998

(30) Foreign Application Priority Data

Sep. 16, 1996 (AT) .............................................. 1627/96

(51) Int. Cl.⁷ ......................... B29C 35/16; B29C 44/02; B29C 39/02
(52) U.S. Cl. ............................ 264/28; 264/50; 264/54; 264/115; 264/320; 162/218
(58) Field of Search ............................ 264/50, 28, 109, 264/115, 54, 320; 162/218

(56) References Cited

U.S. PATENT DOCUMENTS

| | | | |
|---|---|---|---|
| 3,935,924 A | | 2/1976 | Nagao et al. |
| 4,167,548 A | * | 9/1979 | Arduini et al. ............. 264/140 |
| 4,474,949 A | | 10/1984 | Chatterjee et al. |
| 4,613,627 A | * | 9/1986 | Sherman et al. ............. 264/42 |
| 4,683,028 A | * | 7/1987 | Waller et al. ............. 162/218 |
| 4,776,926 A | * | 10/1988 | Lindahl ...................... 162/28 |
| 4,911,789 A | * | 3/1990 | Rieunier et al. ............ 162/158 |
| 5,164,131 A | * | 11/1992 | Chau et al. ................... 264/28 |
| 5,354,427 A | * | 10/1994 | Rasmussen ................. 162/218 |
| 5,401,447 A | * | 3/1995 | Matsui et al. ................. 264/28 |
| 5,611,882 A | * | 3/1997 | Riebel et al. ............... 264/109 |

FOREIGN PATENT DOCUMENTS

| | | | |
|---|---|---|---|
| CH | 254243 | 4/1948 | |
| DE | 3808207 | 9/1989 | |
| DE | 4027786 | 4/1992 | |
| DE | 4207233 | 11/1993 | |
| DE | 4402318 | 8/1995 | |
| EP | 0246588 | 11/1987 | |
| EP | 0402866 | 12/1990 | |
| GB | 2066145 | 7/1981 | |
| HU | 214933 B | 5/1996 | ........... D21H/11/12 |
| JP | 54-38352 | * 3/1979 | ................. 264/109 |
| JP | 59-106600 | * 6/1984 | ................. 162/218 |
| WO | 87/05956 | 10/1987 | |
| WO | 94/15766 | 7/1994 | |

OTHER PUBLICATIONS

N.A. Baranov et al., "Technology for the Production of Paper", Goslasbumizdat, Moscow, 1953, Leningrad.

* cited by examiner

Primary Examiner—Allan R. Kuhns
(74) Attorney, Agent, or Firm—Venable; George H. Spencer; Ashley J. Wells

(57) ABSTRACT

A process for producing a work piece includes providing raw material which is cellulose-containing and fibrous, which is not any part of a tree, and which is selected from the group consisting of, crude plant fibers, pure cellulose, waste paper, and waste cardboard; adding water to the raw material; finely chopping the raw material in a machine by continuously grinding the raw material with a total energy expenditure of at least 0.5 kWh/kg, based on dry weight of the raw material, into a microfiber pulp having an increased internal fiber surface and an increased degree of interlinking; forming the microfiber pulp to provide a shaped green body; and drying the shaped green body by removing water therefrom to harden the shaped green body and form a work piece, wherein the shaped green body is hardened into the work piece by drying only without admixture of bonding agents to the microfiber pulp and without use of external pressure, and wherein the work piece has characteristics which depend on degree of grinding to produce the microfiber pulp and which range from (a) paper carton-like to (b) wood-like to (c) horn-like, the work piece having a specific gravity which ranges up to that of pure cellulose, 1.5.

25 Claims, No Drawings

PROCESS FOR PRODUCING WORKPIECES AND MOLDED PIECES OUT OF CELLULOSE AND/OR CELLULOSE-CONTAINING FIBER MATERIAL

BACKGROUND OF THE INVENTION

1. Field of the Invention

The invention concerns a process for producing blanks or molded bodies with similar characteristics as wood from one or more cellulose-containing, fibrous raw material, e.g. pure cellulose, but also crude fibers or the complete plant or other constituents of hemp, flax, reed, cotton, straw, etc., as well as old cardboard and waste paper, through specific processing of said fibers to form a microfiber pulp which is then dried, if necessary after first draining and forming it, as well as the diverse use of said microfiber pulp as bonding or matrix material for taking up filler materials.

The objective is an economical production of the aforementioned materials, bodies and molded parts having good technical properties, if possible based on ecological criteria.

2. Description of the Related Art

In the patents CH 254243, DE 4207233 A1, EP 402866 A2, U.S. Pat. No. 3,935,924 A, as well as GB 2066145 A, it is suggested using beaten cellulose or microcellulose pulp as bonding agent, filter, speaker membrane or as thickening and reinforcing agent for paper products. These patents appear to oppose individual claims of the patent under consideration. The process suggested in the CH 254243, however, requires extremely long, uneconomical processing times and the resulting, gelatinous slime has a consistency that makes the drainage of water very difficult. In addition, higher densities and strength can be obtained with this process only by using pressure (at least 4 kg/cm$^2$) and heat (above 100° C.).

Basically, considerably lower strengths are achieved on the basis of this Swiss patent and other already known processes than with our process.

Thus, according to the DE 4207233 A1, waste paper is beaten and stirred and, following the introduction of air, is dried to filtering bodies with low strength. It is significant that the inventor considers it necessary to admix the fiber pulp with calcium oxide powder, as is mentioned several times in this patent, in order to obtain firmness and stability for the filter block through a post-curing. The introduction of air into the fiber pulp thus refers to an obviously hardly processed base material with extremely low bonding properties.

The word "microcellulose" by itself generally does not define either the degree of shortening, squeezing, fibril removal, hydration or the adjusted fractional composition of the fibers, which are critical for the internal cross-linkage, matting and bonding properties.

It is significant that the EP 402866 A2 also does not address the fineness via these bonding properties, but via the filtering characteristics of the material, that is to say whether the material is adjusted finely enough to prevent certain particles (e.g. bacteria and the like) from passing through the filter.

The fact that the use of polymers as raw material is also suggested for these filters, in the cited examples as well as the claims, serves as further proof that the refinement function has another purpose as well as has a very different qualitative and quantitative cause. Thus, the processing clearly does not serve to increase the hydrogen bonding between fibers.

The U.S. Pat. No. 3,935,924 A appears to deal only with carbon-fiber reinforced fine paper with somewhat increased bonding properties for speaker membrane production.

All the aforementioned patents use only pure cellulose, but not cheap crude fibers or other plant constituents. Refiners are used only for shortening of cellulose fibers to make these suitable for further processing, e.g. in a "high pressure homogenizer." This high-pressure pulping in an expansion nozzle results in totally different fractional compositions and defibration degrees. The same is true for the GB 2066145 A. The pulp produced with this process has considerably lower bonding properties. It is significant that the suggestion is only for using this pulp as reinforcement for paper, but not for the bonding of wood replacement products such as furniture panels or, following the drying, as synthetic material replacement. Adding approximately 40% highly processed micro pulp, produced according to our process, as suggested in table IX of this patent specification, provides the paper with the properties of wood veneer, which is too hard for paper, is brittle and unusable in this function. The conclusion can be drawn from this as well that substantial differences to the present patent exist.

SUMMARY OF THE INVENTION

In contrast to the processes suggested in said patents, the process in the present patent permits an economical realization for the intended applications. This concerns the processing expenditure as well as the options for the raw material selection, the drainage times and the suggested processing paths for a product realization. Beyond that, the microfiber pulp produced with this process results in work pieces with higher strength values, which can surpass those of hardwood, without having to use bonding and flux agents or external pressures, given a suitable raw material selection and corresponding processing. Specific gravities of up to 1.5 can be achieved in this way. The light-weight and porous variants also have excellent strength values.

DESCRIPTION OF THE PREFERRED EMBODIMENTS

This is achieved through a continuous grinding, chopping and defibration of the cellulose fiber or cellulose-containing fiber in the refiner, wherein a total energy expenditure of at least 0.5 kWh/kg, but ideally 2–2.5 kWh/kg are necessary with a laboratory refiner RO-Escherwys. (In order to determine the actual grinding capacity, the no-load capacity must be deducted from the total energy consumption. Thus, a different ratio between no-load capacity to grinding capacity results if machines with a higher capacity or other suitable fiber chopping and defibration machines are used, and the above-defined total energy consumption must be adapted accordingly.) In this way, a moldable microfiber pulp with very diverse fiber lengths and the tiniest fibril sizes develops, which pulp has the characteristic of hardening to form an ecological, subsequently deformable fiber material with high density (up to a specific gravity of 1.5) and strength without the admixture of adhesives or chemical additives and without the use of pressure, simply through drying and the associated shrinkage.

External pressures and forces applied after the grinding above all serve to effect a quick preliminary drainage, the forming and holding of the form and do not represent a premise for achieving high material strengths. Furthermore, the strengths and densities of the material, as well as the structural fiber arrangements of the work pieces are controlled by varying the raw fiber material used, the amounts of grinding energy and the selected grinding tools, but also the processes used for the prior drainage, forming and drying.

Strength, hardness and formability of the material increase with increasing refinement of the cellulose fiber structure. However, if the fibers are chopped to be extremely small, the strength can be further increased through reinforcement with longer fibers (addition of preferably less than 15% dry substance). The highest strengths can be achieved with an extremely fine-ground microfiber pulp, which is reinforced with a thin net of fibers with varied lengths in a balanced fiber-length distribution. In this case, the extremely fine-ground microfiber pulp provides good bonding—but also good flux—and thus forming characteristics; the reinforcement distributes the pressure, pull, or shear forces onto larger areas and prevents a short break over a small area.

Processing:

The plastic properties of the microfiber pulp depend directly on its water content.

The microfiber dry substance content between 1–15% is very suitable for pumping into water-permeable forms (step 1). Microfiber pulps with this consistency can also be pressed into rigid, impermeable forms, stamped or rolled. In particular, fiber pulps with higher material density are predestined for these processes (step 2).

The following operational steps can be selected, for example, to produce dimensionally accurate products: step 1; then increasing the material density in the blank or the board through simple drying; subsequently step 2. Depending on the desired dimensional accuracy, this step can also be repeated several times with continued drying in respectively reduced forms that correspond to the shrinkage. Or step 2 and again step 2, as in the above, if necessary also several times. Following respective prior drainage, e.g. in a screen conveyor press or other suitable device, step 2 can be carried out even with very high material densities, depending on the desired form for the work piece, and if necessary a dry substance content of up to 90%.

For hollow bodies, in particular larger hollow bodies, a mandrel is recommended, which is positioned inside the blank and holds the shape during the drying. Housings and containers of any type, from a film container to a furniture piece, can be produced in this way.

The material can also be reshaped after the drying or, following the drying and renewed wetting. Thus, boards or form blanks can be wetted again inside a climate chamber with water-vapor saturated air—possibly also directly in a water bath—in a process lasting several hours or days (depending on the thickness and desired degree of deformation). The material absorbs water during this and becomes plastic, flexible and deformable. With suitable devices, it can be formed, bent, stamped, rolled, blanked, etc.

The shaped body then hardens again through simple drying to the previous density, strength and hardness.

With lower material densities, boards, profile sections and more, as well as batches of these, can be produced in continuous production lines, comprising a prior drainage section and/or subsequent drying section. Extrusion presses that start with higher material densities can also lead to the desired result.

The material weight can be reduced continuously from the specific gravity of the cellulose itself (approximately 1.5) by the inclusion of air or other gas bubbles, but also in general through adding light-weight flux materials. This can be done until a degree of lightness is reached that falls below that of the styrofoam packaging material. The spectrum of density and strength thus extends from values that are approximately those of glass-fiber reinforced synthetic materials to wood-like characteristics (range: between hard tropical wood and balsa wood) and up to the highly porous light-weight materials with good insulating capacity. The inclusion of gas can be achieved through various foaming methods (vortexing or injection of air through nozzles or similar devices), the addition of gasifying agents, through fermenting and more, but also through (partial) blocking of the shrinkage with the aid of reinforcements, through incomplete grinding of the fiber pulp, through freezing methods, excessive heating, etc. The transition from these light-weight materials to the dense hard material is realized continuously here through varying the amounts—and/or—the temperature parameters during the freezing, and if necessary also the drying.

Filler materials can be added by simply mixing them in (best method for low material densities) before or after the grinding, wherein the distribution must be watched carefully, but in any case before the drying is completed. It is possible to obtain varied material characteristics by using the most varied filler materials, which can be included in the basic material matrix of microfibers, but also through the raw material selection. Thus, silicates can be added to inhibit fire; graphite is suitable for increasing the mechanical gliding ability, but also the electrical conductivity; the aesthetic valence can be varied and increased with coloring agents, and the material can be realized to be heavier, lighter, insulating or with high heat conductivity and the like. The desired work piece characteristics are achieved through the quantitative ratio of these material admixtures.

Also, the different quantity shares of plants and fibers used can be processed more or less and parts thereof (those processed more) can function as bonding agents, while others (those less processed) can serve as reinforcement and drainage felt. Strength, specific gravity, insulation value and other technical characteristics are adjusted via the quantity shares, the respective degree of processing as well as the mechanically obtained approximation of the fiber particles prior to the drying.

All these "secondary materials" derived from the microfiber base material, which can be produced through admixtures, raw material selection and process variations in the aforementioned way, are also claimed in the herein presented patent.

EXAMPLE 1

Hemp fiber is ground in a watery solution (8% dry substance) until the microfiber pulp has a pudding-like consistency. This microfiber pulp is pumped into permeable forms and drained to 25% dry substance. The body is then dried to 85% dry substance and subsequently provided with its shape in a respective stamping mold.

EXAMPLE 2

Waste paper is ground in a watery solution (7% dry substance) until microfiber pudding results. This material is drained in a screen conveyor press to form a rope with 40% dry substance. If necessary and depending on the later desired form, it can also be drained to a considerably higher material density. The resulting solid material pulp is pressed into a form and, following an intermediate drying to up to 90% dry substance, is subsequently restamped once or several times if necessary. The resulting formed parts are then dried completely.

EXAMPLE 3

Following a shortening to make it usable for processing, hemp straw is ground in a watery solution (6% dry substance) until a pudding-like substance results. This substance is then dried to form rigid boards with 75–90% dry substance (possibly after prior drainage to 40–60% and/or during continued rolling). The board is then dried completely for a direct usage of the board, or glasses, disposable dishes & cutlery, bowls, cassettes, relief doors and the like are produced with the aid of stamping and punching tools.

EXAMPLE 4

Cellulose, waste paper or secondary cotton cut is ground in a watery solution (5% dry substance) until a pudding-like micro-cellulose fiber pulp results. This pulp is pumped into a permeable form containing a drying mandrel, and is briefly drained of water. Following the drying on the mandrel, the blank with approximately 80% dry substance is given its final form in a metal mold.

EXAMPLE 5

Hemp straw or waste paper is ground in a watery solution (7% dry substance) until a microfiber pulp results. This pulp is formed into a thick board and—if necessary after prior drainage—is foamed by introducing gas. A thin layer of non-foamed microfiber pulp is subsequently applied to the top and bottom of the board and the molded piece, which is clamped between air-permeable grids to retain the stability of the form, or is held in shape in a drying tunnel through rolling, is then dried at 40–90° C. The resulting multilayer board is light-weight, has good insulating properties, but at the same time is also firm and has hard surfaces.

EXAMPLE 6

50% hemp fiber, 48% hemp cellulose & 2% earth pigment are ground in a watery solution (8% dry substance) until a pudding-like fiber pulp results. This pulp is then reinforced with layers of hemp fiber (fiber length: 1.0 cm–30.0 cm; 10% total dry substance) and is applied to a ball-shaped paraffin form. Following the drying and hardening, the formed part is opened by drilling and the paraffin is subsequently melted and removed through heating. Hollow balls or similar molded parts with high strength can be produced in this way.

EXAMPLE 7

Hemp straw or hemp shavings are shortened to be usable for processing. Subsequently, ⅓ of the plant material mass is subjected to high processing, ⅓ to moderate processing, ⅓ is simply slightly defibered and all shares are subsequently mixed together homogeneously. The first third forms the "adhesive matrix," the second third an "interlinking and drainage felt," and the third one serves as "blocking and filler material" as well as reinforcement. By increasing the highly processed shares, the material becomes more wood-like, firmer and denser, by reducing the degree of processing or the highly processed shares, the material becomes light-weight and heat as well as sound damping. All types of boards as well as blanks and molded parts, housings, packagings, etc. can be produced from this fiber pulp.

The variant with shavings contains hardly any long-fiber shares. If reinforcing is necessary, these can be added at a percentage share that is not too high.

What is claimed is:

1. A process for producing a work piece which includes no preliminary chemical treatment step, comprising:

providing raw material which is cellulose-containing and fibrous, and which is selected from the group consisting of crude plant fibers, pure cellulose, waste paper, and waste cardboard;

adding water to the raw material;

finely chopping the raw material in a machine by continuously grinding the raw material with a total energy expenditure of at least 0.5 kWh/kg, based on dry weight of the raw material, into a microfiber pulp having an increased internal fiber surface and an increased degree of interlinking;

forming the microfiber pulp to provide a shaped green body; and drying the shaped green body by removing water therefrom to harden the shaped green body and form a work piece, wherein the shaped green body is hardened into the work piece by drying only without admixture of bonding agents to the microfiber pulp and without use of external pressure, and wherein the work piece has characteristics which depend on degree of grinding to produce the microfiber pulp and which range from (a) paper carton-like to (b) wood-like to (c) horn-like, the work piece having a specific gravity which ranges up to that of pure cellulose, 1.5.

2. The process according to claim 1, further comprising draining water from the microfiber pulp, prior to forming, to provide a drained pulp which is drained to from 25 to 60% of dry substance in the microfiber pulp.

3. The process according to claim 2, further comprising venting the microfiber pulp prior to forming.

4. The process according to claim 1, further comprising venting the microfiber pulp prior to forming.

5. The process according to claim 1, wherein the plant is selected from the group consisting of hemp, flax, reed, cotton, straw, grass, and algae.

6. The process according to claim 1, wherein chopping is accomplished by continuous grinding in a machine selected from the group consisting of a fiber mill, a refiner, and a defibration machine.

7. The process according to claim 1, further comprising adding at least one material to the microfiber pulp at least one of before or after grinding, the at least one material being selected from the group consisting of long fibers for reinforcement, shavings for filling light-weight raw material, gases for filling light-weight raw material, sodium silicate (Na Si) for fire protection, pigment for coloration, graphite for gliding enhancement, and graphite for electrical conductivity.

8. The process according to claim 1, further comprising preparing a plurality of microfiber pulps by at least one of (a) separately grinding raw material to varying degrees to provide a plurality of microfiber pulps or (b) separately grinding a plurality of raw materials to provide a plurality of microfiber pulps, and mixing together the plurality of microfiber pulps.

9. The process according to claim 1, wherein forming the microfiber pulp to provide a shaped green body is accomplished by at least one of spraying, pumping, pressing, stamping, rolling or otherwise placing the microfiber pulp into or onto forms, and wherein the process further comprises, following drying in at least one drying stage during which shrinkage occurs, reshaping the shaped green body to preselected dimensional criteria at least once by employing a form which is smaller than that previously employed.

10. The process according to claim 1, further comprising draining water from the microfiber pulp, prior to forming, to provide a drained pulp, wherein the drained pulp is formed into boards by at least one of (a) squeezing the drained pulp in a squeezing device or (b) extruding the drained pulp, and subsequently drying, optionally including rolling, to form the work piece.

11. The process according to claim 1, further comprising draining water from the microfiber pulp, prior to forming, to provide a drained pulp, wherein the drained pulp is formed into a profile section by at least one of (a) squeezing the drained pulp in a squeezing device or (b) extruding the drained pulp into a form, and subsequently drying, optionally including rolling or drying on a forming rail that serves as drying mold and one of remains in the work piece or is removed.

12. The process according to claim 1, further comprising shaping the work piece after drying by at least one of bending, stamping, blanking, deep-drawing, other reshaping or molding into a preselected shape based on its purpose, either in a wet or in a dry state.

13. The process according to claim 1, further comprising supporting the shaped green body with a drying mold during at least a part of drying to provide form stability, and one of (a) leaving the drying mold in place after drying as a "lost mold" or (b) removing the drying mold after drying.

14. The process according to claim 1, further comprising preparing a suspension of the microfiber pulp in a suspension means other than water and using one of (a) the suspension to form the shaped green body or (b) a mixture of the microfiber pulp and the suspension to form the shaped green body.

15. The process according to claim 1, wherein forming the microfiber pulp into a shaped green body is accomplished by spraying the microfiber pulp at least once onto or into a mold, and wherein drying is performed one of (a) after each spraying step or (b) after spraying is complete.

16. A process for producing a work piece, comprising:
providing raw material which is cellulose-containing and fibrous;
adding water to the raw material;
finely chopping the raw material by continuously grinding same into a microfiber pulp having an increased internal fiber surface and an increased degree of interlinking;
freezing the microfiber pulp while in a watery state to cause formation of an internal structure;
forming the microfiber pulp to provide a shaped green body; and
drying the shaped green body by removing water therefrom to harden the shaped green body and form a work piece which is provided with a porous, gas-containing and light-weight structure due to prevention of contraction because of the internal structure so that a dense, high-strength material is formed,
wherein the shaped green body is hardened into the work piece by drying only without admixture of bonding agents to the microfiber pulp and without use of external pressure, and
wherein the work piece has characteristics which depend on degree of grinding to produce the microfiber pulp and which range from (a) paper carton-like to (b) wood-like to (c) horn-like, the work piece having a specific gravity which ranges up to that of pure cellulose, 1.5.

17. A process of producing a work piece, comprising:
providing raw material which is cellulose-containing and fibrous;
adding water to the raw material;
finely chopping the raw material by continuously grinding same into a microfiber pulp having an increased internal fiber surface and an increased degree of interlinking;
introducing gas bubbles into the microfiber pulp by at least one of (a) vortexing the microfiber pulp to introduce gas therein, (b) introducing compressed gas into the microfiber pulp, (c) introducing gas into the microfiber pulp by gas jets, (d) admixing into the microfiber pulp a gas-producing expanding agent, and (e) fermenting the microfiber pulp;
forming the microfiber pulp to provide a shaped green body; and
drying the shaped green body by removing water therefrom to harden the shaped green body and form a work piece which has a porous, gas-containing, light-weight structure,
wherein the shaped green body is hardened into the work piece by drying only without admixture of bonding agents to the microfiber pulp and without use of external pressure, and
wherein the work piece has characteristics which depend on degree of grinding to produce the microfiber pulp and which range from (a) paper carton-like to (b) wood-like to (c) horn-like, the work piece having a specific gravity which ranges up to that of pure cellulose, 1.5.

18. A process for producing an article, comprising:
providing raw material which is cellulose-containing and fibrous, and which is selected from the group consisting of crude plant fibers, pure cellulose, waste paper, and waste cardboard;
adding water to the raw material;
finely chopping the raw material in a machine by continuously grinding the raw material with a total energy expenditure of at least 0.5 kWh/kg, based on dry weight of the raw material, into a microfiber pulp having an increased internal fiber surface and an increased degree of interlinking;
applying the microfiber pulp to at least one article as one of (a) an adhesive or (b) a coating to provide an assembly; and
drying the assembly by removing water from the microfiber pulp to harden the microfiber pulp,
wherein the microfiber pulp is produced without any preliminary chemical treatment step,
wherein the microfiber pulp is hardened by drying only without admixture of bonding agents to the microfiber pulp and without use of external pressure, and
wherein the microfiber pulp after drying has characteristics which depend on degree of grinding to produce the microfiber pulp and which range from (a) paper carton-like to (b) wood-like to (c) horn-like, the microfiber pulp after drying having a specific gravity which ranges up to that of pure cellulose, 1.5.

19. The process according to claim 18, wherein the at least one article is selected from the group consisting of fiber board, particle board, light-weight material, paper, and stiff cardboard.

20. A process for producing an article, comprising:
providing raw material which is cellulose-containing and fibrous, and which is selected from the group consisting of crude plant fibers, pure cellulose, waste paper, and waste cardboard;

adding water to the raw material;

finely chopping the raw material in a machine by continuously grinding the raw material with a total energy expenditure ranging from 2 to 2.5 kWh/kg, based on dry weight of the raw material, into a microfiber pulp having an increased internal fiber surface and an increased degree of interlinking;

applying the microfiber pulp to at least one article as one of (a) an adhesive or (b) a coating to provide an assembly; and drying the assembly by removing water from the micro fiber pulp to harden the microfiber pulp, wherein the microfiber pulp is hardened by drying only without admixture of bonding agents to the microfiber pulp and without use of external pressure, and wherein the microfiber pulp after drying has characteristics which depend on degree of grinding to produce the microfiber pulp and which range from (a) paper carton-like to (b) wood-like to (c) horn-like, the microfiber pulp after drying having a specific gravity which ranges up to that of pure cellulose, 1.5.

21. A process for producing a work piece which includes no preliminary chemical treatment step, comprising:

providing raw material which is cellulose-containing and fibrous, and which is selected from the group consisting of crude plant fibers, pure cellulose, waste paper, and waste cardboard;

adding water to the raw material;

finely chopping the raw material in a machine by continuously grinding the raw material with a total energy expenditure ranging from 2 to 2.5 kWh/kg, based on dry weight of the raw material, into a microfiber pulp having an increased internal fiber surface and an increased degree of interlinking;

forming the microfiber pulp to provide a shaped green body; and drying the shaped green body by removing water therefrom to harden the shaped green body and form a work piece, wherein the shaped green body is hardened into the work piece by drying only without admixture of bonding agents to the microfiber pulp and without use of external pressure, and wherein the work piece has characteristics which depend on degree of grinding to produce the microfiber pulp and which range from (a) paper carton-like to (b) wood-like to (c) horn-like, the work piece having a specific gravity which ranges up to that of pure cellulose, 1.5.

22. A process for producing a work piece which includes no preliminary chemical treatment step and consists essentially of the steps of:

providing raw material which is cellulose-containing and fibrous, and which is selected from the group consisting of crude plant fibers, pure cellulose, waste paper, and waste cardboard;

adding water to the raw material;

finely chopping the raw material in a machine by continuously grinding the raw material with a total energy expenditure of at least 0.5 kWh/kg, based on dry weight of the raw material, into a microfiber pulp having an increased internal fiber surface and an increased degree of interlinking;

forming the microfiber pulp to provide a shaped green body; and drying the shaped green body by removing water therefrom to harden the shaped green body and form a work piece, wherein the shaped green body is hardened into the work piece by drying only without admixture of bonding agents to the microfiber pulp and without use of external pressure, and wherein the work piece has characteristics which depend on degree of grinding to produce the microfiber pulp and which range from (a) paper carton-like to (b) wood-like to (c) horn-like, the work piece having a specific gravity which ranges up to that of pure cellulose, 1.5.

23. The process according to claim 22, wherein the process includes no preliminary chemical treatment step.

24. A process for producing an article, consisting essentially of the steps of;

providing raw material which is cellulose-containing and fibrous, and which is selected from the group consisting of crude plant fibers, pure cellulose, waste paper, and waste cardboard;

adding water to the raw material;

finely chopping the raw material in a machine by continuously grinding the raw material with a total energy expenditure of at least 0.5 kWh/kg, based on dry weight of the raw material, into a microfiber pulp having an increased internal fiber surface and an increased degree of interlinking;

applying the microfiber pulp to at least one article as one of (a) an adhesive or (b) a coating to provide an assembly; and drying the assembly by removing water from the microfiber pulp to harden the microfiber pulp, wherein the microfiber pulp is hardened by drying only without admixture of bonding agents to the microfiber pulp and without use of external pressure, and wherein the microfiber pulp after drying has characteristics which depend on degree of grinding to produce the microfiber pulp and which range from (a) paper carton-like to (b) wood-like to (c) horn-like, the microfiber pulp after drying having a specific gravity which ranges up to that of pure cellulose, 1.5.

25. The process according to claim 24, wherein the process includes no preliminary chemical treatment step.

* * * * *